(12) United States Patent
McDermott (10) Patent No.: US 9,548,789 B1
(45) Date of Patent: Jan. 17, 2017

(54) BREAKING UP SYMBOLS FOR SPECTRAL WIDENING

(71) Applicant: Higher Ground LLC, Palo Alto, CA (US)

(72) Inventor: Scott McDermott, Washington, DC (US)

(73) Assignee: Higher Ground LLC, Palo Alto, CA (US)

( * ) Notice: Subject to any disclaimer, the term of this patent is extended or adjusted under 35 U.S.C. 154(b) by 0 days.

(21) Appl. No.: 14/789,625

(22) Filed: Jul. 1, 2015

Related U.S. Application Data (63) Continuation of application No. 14/789,524, filed on Jul. 1, 2015.

(51) Int. Cl.
*H04L 25/03* (2006.01)
*H04B 1/707* (2011.01)

(52) U.S. Cl.
CPC ......... *H04B 1/707* (2013.01); *H04L 25/03866* (2013.01)

(58) Field of Classification Search
CPC .................. H04B 1/707; H04L 25/03866
See application file for complete search history.

(56) References Cited

U.S. PATENT DOCUMENTS

| | | | | |
|---|---|---|---|---|
| 5,504,775 A | * | 4/1996 | Chouly | H04J 11/00 370/210 |
| 5,909,462 A | * | 6/1999 | Kamerman | H04B 1/707 375/147 |
| 5,995,533 A | * | 11/1999 | Hassan | H04J 13/00 375/140 |
| 6,215,810 B1 | * | 4/2001 | Park | H04B 1/692 375/131 |
| 6,574,270 B1 | * | 6/2003 | Madkour | H04B 1/71072 375/144 |
| 6,628,667 B1 | * | 9/2003 | Murai | H04J 13/12 370/335 |
| 2003/0156624 A1 | * | 8/2003 | Koslar | H04B 1/69 375/131 |
| 2003/0161411 A1 | * | 8/2003 | McCorkle | G01S 7/023 375/295 |

(Continued)

FOREIGN PATENT DOCUMENTS

WO      9516310 A1      6/1995

OTHER PUBLICATIONS

Int'l Search Report and Written Opinion issued Sep. 2, 2016 in Int'l Application No. PCT/US16/40110.

(Continued)

*Primary Examiner* — Kenneth Lam
(74) *Attorney, Agent, or Firm* — Panitch Schwarze Belisario & Nadel LLP (57) ABSTRACT

A technique for spectral widening in a communication system may divide respective symbols of a block of symbols into symbol pieces of shorter duration than a symbol. The symbol pieces may be scrambled. The resulting scrambled symbol pieces may optionally be further spread using direct-sequence spreading prior to transmission. Error-control coding may also be used prior to dividing the symbols into symbol pieces and scrambling the symbol pieces. Additionally, the number of symbol pieces per symbol may be adjustable, based on channel characteristics, performance, or both.

23 Claims, 5 Drawing Sheets

(56) References Cited

U.S. PATENT DOCUMENTS

| | | | |
|---|---|---|---|
| 2004/0008265 A1* | 1/2004 | Pedigo | H04B 1/707 348/211.2 |
| 2004/0196780 A1 | 10/2004 | Chin et al. | |
| 2009/0323778 A1* | 12/2009 | Woodard | H04B 1/7117 375/148 |
| 2010/0304681 A1* | 12/2010 | Ghassemzadeh | H04B 1/71632 455/63.1 |

OTHER PUBLICATIONS

Office Action issued Jun. 21, 2016 in U.S. Appl. No. 14/789,524, by McDermott.

* cited by examiner

BREAKING UP SYMBOLS FOR SPECTRAL WIDENING

CROSS-REFERENCE TO RELATED APPLICATION

This application is a continuation of U.S. patent application Ser. No. 14/789,524, also entitled "Breaking Up Symbols for Spectral Widening," filed on Jul. 1, 2015, co-assigned, and incorporated by reference herein.

FIELD OF ENDEAVOR

Aspects of the present disclosure may relate to techniques for spreading/widening the spectrum of a communication signal.

BACKGROUND

In communication systems, one may need a symbol to contain a certain received energy, usually termed $E_s$, in order to correctly decode the information carried by the symbol. However, in some situations, one may also need the transmitted power per Hertz (Hz) to be below some ceiling. This is often required to avoid interfering with other signals in the same frequency band. One way to do this may be to widen the spectrum of the transmitted signal, i.e., to transmit the same energy over a wider bandwidth, in order to be able to meet such a constraint. For example, if one would like to transmit 10 kbps and would need somewhere in the 13-20 kHz range to send it, one may need to spread that power across, e.g., 1 MHz of bandwidth.

One known way to do this is direct-sequence (DS) spreading. In a DS spread-spectrum (DSSS) system, each symbol to be transmitted may be multiplied by a spreading sequence, which may be, for example, but is not limited to, a pseudo-random sequence (to be referred to as a "PN sequence" herein). As a result, for a particular symbol, one may multiply by, for example, an 80-chip PN sequence, and the resulting increase in the number of transitions (which may be in phase, frequency or amplitude or some other characteristic) between those chips may serve to widen the spectrum.

An issue in using DSSS is that it may make acquisition more difficult, and the longer the PN sequence used, the more difficult acquisition becomes. As a result, long training sequences may be needed to provide synchronization/acquisition for DSSS systems using long PN sequences. Therefore, it may be desirable to use another technique to shorten the length of the PN sequence needed or instead of using DSSS.

SUMMARY OF THE DISCLOSURE

Various aspects of the disclosure may be directed to spectral widening techniques that may be used in conjunction with or in lieu of DSSS. Such techniques may break up blocks of symbols to be transmitted into pieces and may scramble (or interleave) the pieces and transmit the scrambled pieces. At the receive side, the pieces may be descrambled (or de-interleaved) to recover the original symbols. Error-control coding techniques may be used in conjunction with this breaking up and scrambling of symbols, which may help to ensure corrected reception of information.

Various operations may be performed by dedicated electronic hardware devices, or alternatively, may be implemented using other hardware, software, or firmware, or combinations thereof, including the possibility of using a processor that may execute software instructions, which may, e.g., be saved on a storage device, and which may cause the operations to be implemented.

BRIEF DESCRIPTION OF ACCOMPANYING DRAWINGS

Various aspects of this disclosure will now be discussed in further detail in conjunction with the attached drawings, in which:

FIG. 3, consisting of FIGS. 3A-3D, shows a conceptual example of signaling, according to an aspect of the disclosure;

DETAILED DESCRIPTION OF ASPECTS OF THE DISCLOSURE

Figure 4:
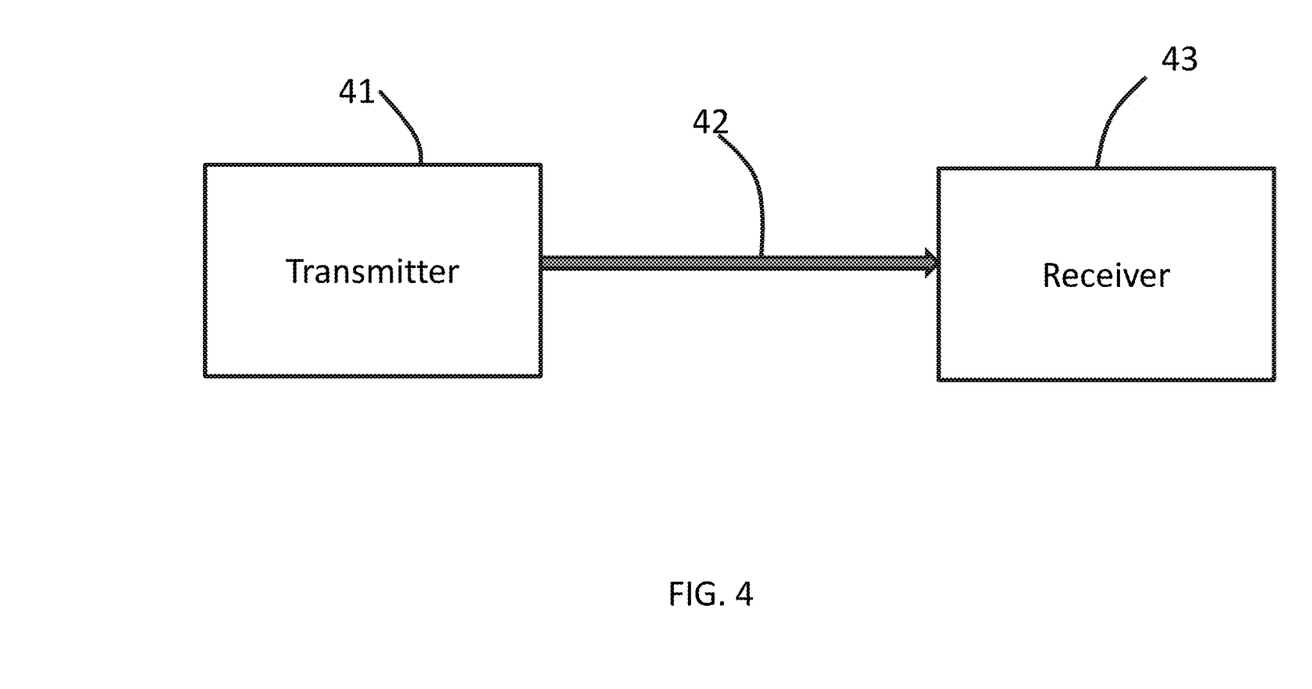
FIG. 4 shows an example of a further conceptual block diagram, according to an aspect of the disclosure.

As shown in FIG. 4, a communication system may have transmit 41 and receive 43 sides, between which signals 42 may be transmitted. Either or both sides may have both transmit and receive capabilities, which may result in "transceivers" and may allow for bi-directional communications. In some cases, the signals 42 may traverse one or more repeaters or transponders between the transmit 41 and receive 43 sides, such as a geosynchronous satellite, but the invention is not thus limited.

In some cases, a power density of a transmitted signal 42 may need to be limited. For example, a frequency band in which signal 42 is transmitted may be allocated for other uses. In such cases, if the power of signal 42 is maintained at a level below a particular "noise floor," it may still be acceptable to transmit in that frequency band. For example, in some bands in the United States, the Federal Communications Commission ("the FCC") may allocate frequency bands while allowing other uses of the same bandwidth, provided that the signals corresponding to the other uses are of sufficiently low power as not to interfere with the signaling to which the bands are allocated. As noted above, DSSS is one way to do this, but there may be drawbacks to doing so, and simply transmitting signals at a sufficiently low power level may result in it not being possible to reliably communicate.

Figure 1:
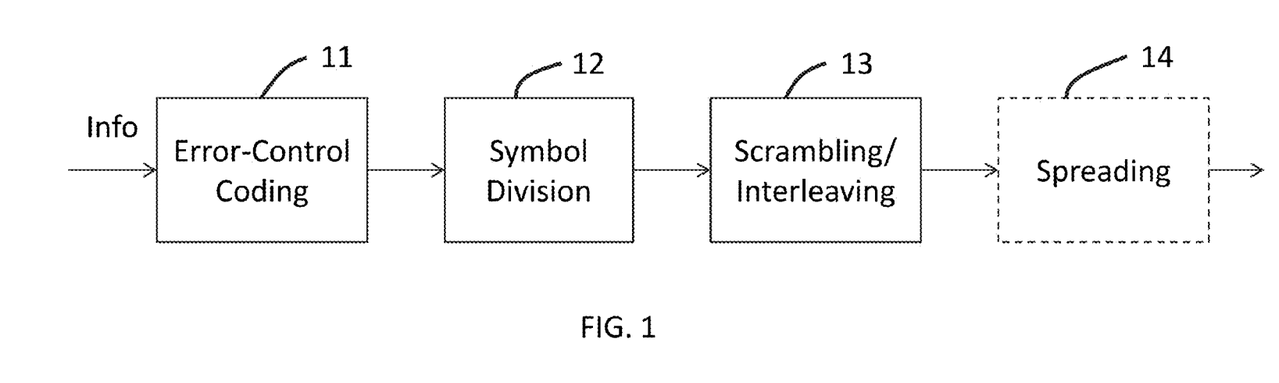
FIG. 1 shows an example of a conceptual block diagram according to various aspects of the disclosure.
Figure 2:
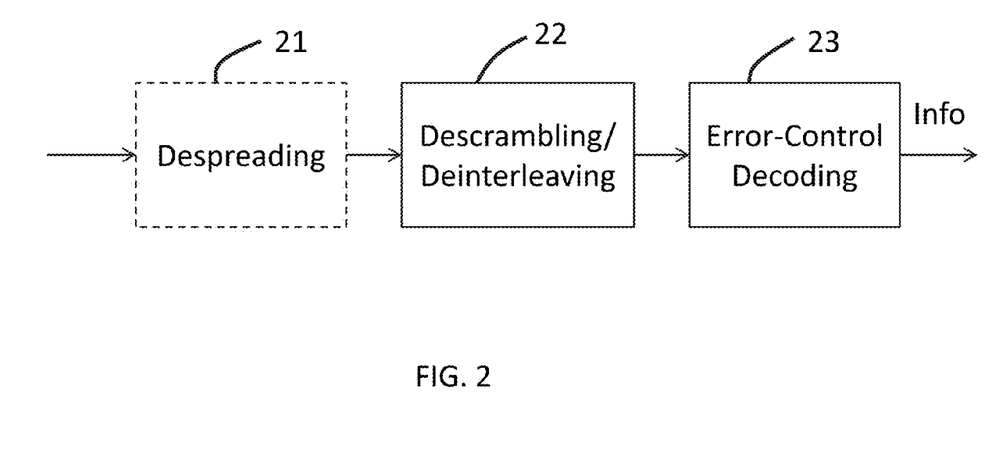
FIG. 2 shows another example of a conceptual block diagram, according to various aspects of the disclosure.

According to an aspect of this disclosure, examples of which are shown in FIGS. 1-3, it may be possible to use a further technique, either alone or in combination with DSSS, which may alleviate some of the issues stated above. As shown in FIG. 1, information may be provided for error-control coding 11; however, the invention is not limited to systems using error-control coding 11, and this may be omitted, according to some aspects of this disclosure. Such information may, for example, be in the form of binary or non-binary symbols (bits or M-ary symbols). In one example, shown in FIG. 3A, eight symbols may be provided for error-control coding; but the invention is not thus limited. The error-control coding 11 is not limited to any particular coding technique and may, for example, comprise algebraic coding, convolutional coding, parity check coding, turbo coding, block coding, systematic or non-systematic coding, etc. Error-control coding 11 may be implemented, e.g., in the form of a coding chip or chipset or other hardware, software, firmware or combination thereof. In a relatively simple example shown in FIG. 3B, the eight symbols of FIG. 3A may be encoded into sixteen code symbols, i.e., by using a rate one-half encoder. The sixteen code symbols are labeled "1" to "16" in FIG. 3B, and for the sake of simplicity, the eight original information symbols may correspond to code symbols 1-8, while code symbols 9-16 may correspond to "parity check" symbols, in a systematic rate one-half code; however, it is emphasized that the invention is not limited to this type of encoding.

As a rule of thumb in communication systems, there is a certain amount of energy, $E_s$, which must be present in each symbol at the receiver 43 for correct reception to take place an acceptable percentage of the time (e.g., to ensure an acceptable average symbol error rate or bit error rate). Energy is power multiplied by time. Thus, along the 't' axis of FIG. 3B, for a given amount of total transmitted power per symbol and a given signal path 42, there is some minimum amount of time that a given code symbol, e.g., code symbol 8, must occupy in order to have successful communication, on average (it is noted that, while this is discussed in the context of "code symbols," the discussion may be applicable to uncoded systems, as mentioned above, according to other aspects of this disclosure). This time may be contiguous, as is the case in many known communication systems; i.e., the transmitter may begin transmitting a symbol, may continue doing so for at least the required minimum amount of time, and may then then stop transmitting the symbol.

However, this contiguous transmission of one symbol may concentrate the signal's power density. A signal's power density is, to a first order, the amount of power being transmitted, divided by the bandwidth it occupies. The bandwidth it occupies, in turn, is proportional to the number and character of transitions present in the signal. In various communication techniques, the number of transitions may be considered equal to the number of bits, symbols, or DSSS chips sent per unit time, whichever is greatest. According to an aspect of this disclosure, a fourth option is added, namely, the number of pieces a single symbol is broken into.

Figure 3A:
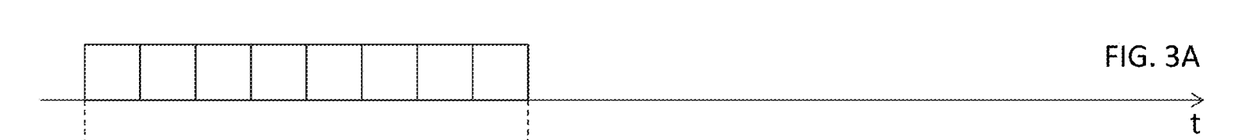
Figure 3B:
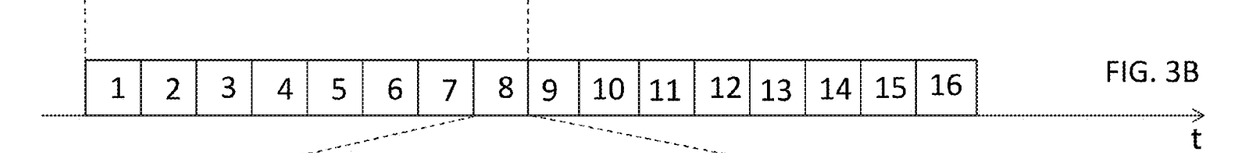
Figure 3C:
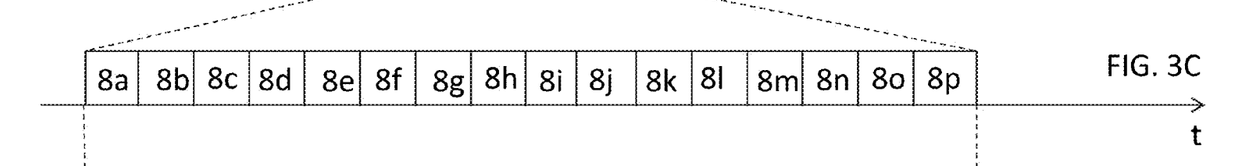

Thus, according to an aspect of this disclosure, the code symbols output from error-control coding 11 may be divided 12 into multiple pieces. In one example, as shown in FIG. 3C, code symbol 8 may be divided into sixteen pieces, 8a, 8b, . . . , 8p. They are shown here of substantially equal length in time; however, this is an example, and the invention is not limited to equal-duration pieces. This may be performed, e.g., by one or more switching devices, which may be implemented in parallel. This may be followed by scrambling/interleaving 13.

Note that, while shown in FIG. 1 as preceding and being separate from scrambling/interleaving 13, symbol division 12 need not necessarily be a separate operation. For example, the scrambling/interleaving 13 may include switching operations that may select pieces from a block of code symbols output from error-control coding 11 (or a block of uncoded symbols) in an order according to a scrambling/interleaving algorithm implemented in scrambling/interleaving 13.

It is further noted that the number of pieces into which code symbols are divided 12 may not be fixed. While keeping the duration of a symbol-piece fixed, the number of pieces integrated together to make a symbol may be variable and adjustable. For example, to which the invention is not limited, the number of pieces into which symbols are divided may be changed based, e.g., on measured channel conditions or feedback received from a receiver receiving and/or processing the transmitted signal reflecting performance, such as, but not limited to, signal-to-noise ratio, bit- or symbol-error rate, etc. If channel conditions are poor or performance is not acceptable, symbol division 12 may be adjusted to increase the number of pieces allocated to a given symbol, increasing the amount of time over which that symbol can be integrated, which may thus increase the total energy $E_s$ received at receiver 43. Similarly, if channel conditions are determined to be better than expected or performance is better than some predetermined threshold, symbol division 12 may be adjusted to decrease the number of pieces allocated to a given symbol, even down to a single piece per symbol, the maximum rate of the system. According to this aspect of the disclosure, the total occupied bandwidth, and any spreading applied to symbol pieces, and all of the processing and logic associated with them, may remain identical across a wide range of ultimate symbol rates. The only change may occur during division and re-integration of symbol pieces, which may thus leave all the rest of the system in between unchanged.

Figure 6:
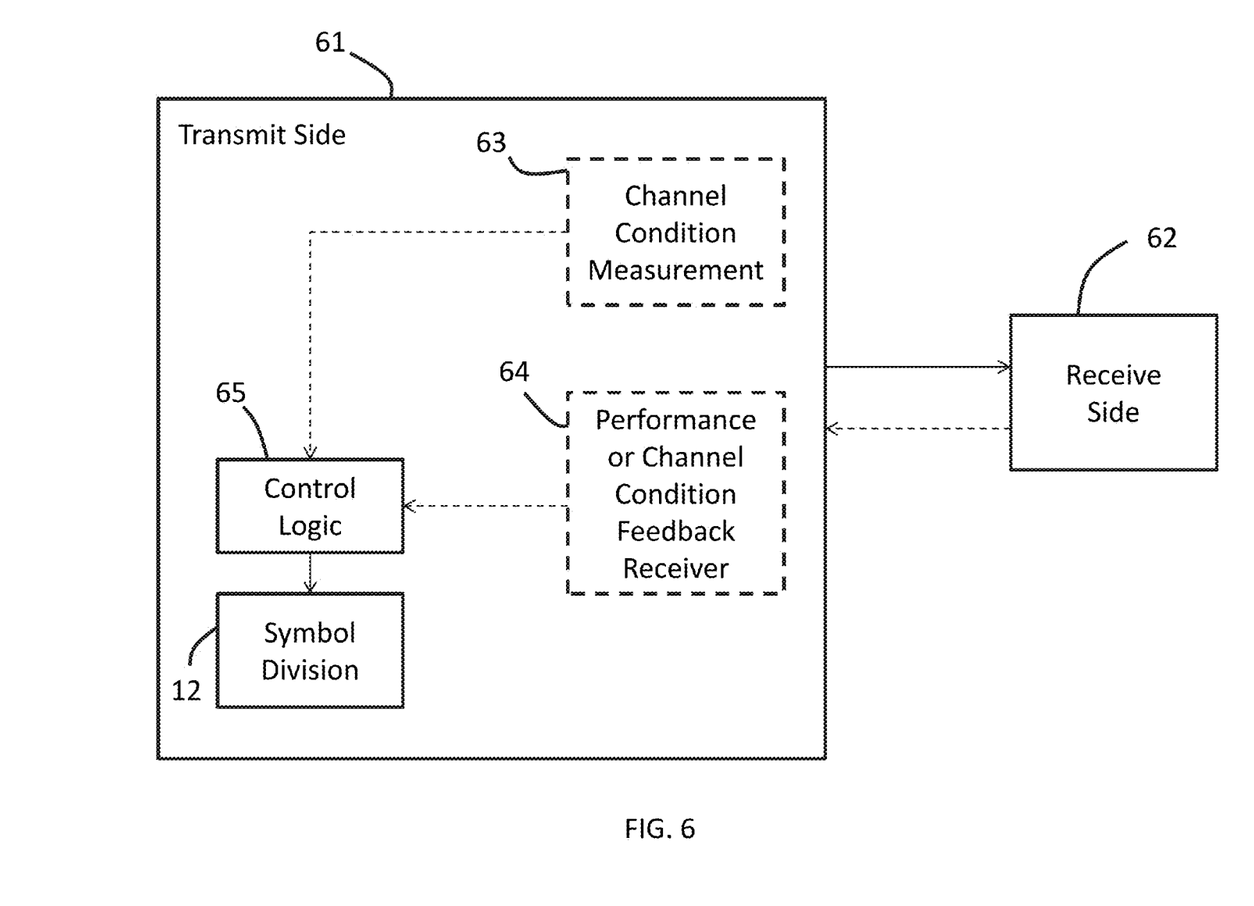
FIG. 6 shows a conceptual block diagram of a technique and components according to another aspect of the disclosure.

FIG. 6 shows an example of a block diagram of a system that may be used to implement adaptive symbol division. On the transmit side 61, which may include symbol division 12, either or both of channel condition measurement 63 or reception of information indicative of performance or channel conditions 64 may be performed. A channel condition measurement block 63 may receive signals and estimate, for example, a signal-to-noise ratio (SNR) or similar indication of channel conditions. The indication of channel conditions may be provided to control logic 65 and processed to determine whether or not to adjust symbol division 12 and, if so, how to adjust it. For this purpose, control logic 65 may perform one or more comparisons of values received from channel condition measurement 63, e.g., with one or more predetermined or adaptive thresholds, to determine a number of pieces into which symbol division 12 may divide code symbols. As an alternative, or in conjunction with channel condition measurement 63, the transmit side 61 may receive feedback from a receive side 62. This feedback may be in the form of channel condition measurements or indications thereof (e.g., SNR, received signal strength indicator (RSSI), etc.) and/or performance-related information (e.g., bit-error rate, symbol-error rate, received signal power/energy, etc., or indication(s) thereof (e.g., but not limited to, numerical indicators or quantized versions thereof)). For this purpose, a receiver 64 may receive such feedback and may provide it to control logic 65. Control logic 65 may, again, analyze the received feedback, e.g., using one or more threshold comparisons (which, again, may use predetermined thresholds and/or adaptive thresholds), and may thereby determine how to control symbol division 12. Note that channel condition measurement 63 and/or performance or channel condition feedback receiver 64 may both be present and may both provide one or more types of information to control logic 65, which may perform various combinations, comparisons, etc., of the information received from blocks 64 and 65 to determine how to control symbol division 12. For example, feedback information may be weighted more heavily than local measurements. Control of symbol division 12 by control logic 65 may be by provision to symbol division 12 of a number of pieces into which symbols are to be divided or an indication to increment or decrement (or neither) a number of pieces used for symbol division.

While not shown in FIG. 6, it may also be necessary to adapt the scrambler/interleaver 13, based on the number of pieces per symbol. Scrambler/interleaver 13 may receive a control signal from control logic 65 to indicate the number of pieces per symbol, which affects the number of pieces per block, and this may be used to adapt the scrambler/interleaver 13, e.g., by selecting a scrambling/interleaving scheme appropriate to the number of pieces. It is further noted that, for purposes of coordination, the number of pieces into which symbols are being divided may be transmitted to receive side 62 and may be used, e.g., to control de-scrambler/de-interleaver 22 to similarly adapt (which may, again, be by selecting an appropriate scheme).

Continuing the example shown in FIG. 3, scrambling/interleaving 13 may select various pieces of various symbols and arrange them according to some scrambling/interleaving scheme. FIG. 3D shows a non-limiting example of what the pieces in the eighth symbol period may look like after scrambling. In this example, the particular symbol interval includes pieces of all sixteen symbols, $16i$, $4k$, $11n$, $8q$, . . . , but the invention is not limited to any particular scrambling/interleaving scheme. Note that the scrambling/interleaving 13 may be optimized to ensure that there are no or minimal peaks in the spectrum of the resulting signal and may, therefore, use some pseudo-random technique; such a technique may help to ensure that the pieces of a given symbol are disposed sufficiently "randomly" so as to prevent or minimize spectral peaks. It is also noted that the scrambling/interleaving 13 may be implemented in the form of a dedicated hardware block (a "scrambler" or "interleaver"), which may be a chip or chipset, or using hardware, software, firmware, or a combination thereof.

Figure 3D:
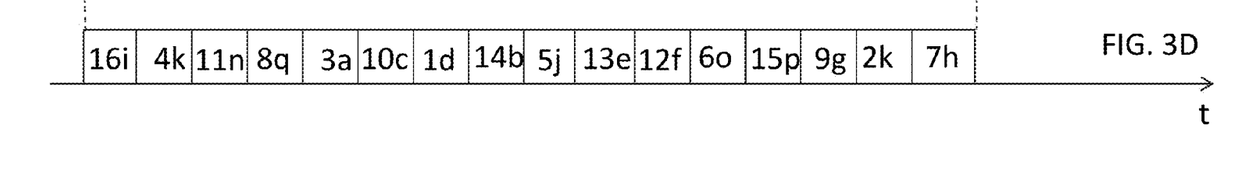

To elaborate further, the result of scrambling the symbol pieces as shown in FIG. 3D may, in general, be to increase the number of transitions (in phase, frequency, amplitude, or other characteristic) per unit time. Whereas the time period for symbol 8 in FIG. 3B had zero transitions, the same time period in FIG. 3D may have up to 15 transitions (on average, if the data were random binary data, this may typically be seven or eight transitions). By increasing the number of transitions per unit time, the signal's power density decreases; but by having each symbol occupy the same total amount of time in both FIG. 3B and FIG. 3D, total symbol energy $E_s$ is not affected, given the same transmitted power.

As further shown in FIG. 1, scrambling/de-interleaving 13 may be followed by spreading 14, e.g., DSSS spreading. Spreading 14 may optionally be used, for example, if the spectral widening effected by breaking up the symbols into pieces is not sufficient to lower the energy level of the signal sufficiently to meet requirements of the frequency band on which the signal may be transmitted. However, as a result of the breaking up of the symbols into pieces 12 and the scrambling/interleaving 13, at least some degree of spectral widening may be obtained, so if additional spreading 14 is needed, it may be to a lesser degree than may otherwise be needed, e.g., to meet energy level requirements in a frequency band of interest (in one example of an implementation, spreading 14 may use a shorter spreading sequence that may be easier to acquire than a spreading sequence that might be used to obtain a similar degree of spectral widening, if the symbols were not broken up into pieces). Note that DSSS spreading may be implemented using any of a number of known hardware or software implementations (e.g., a sequence generator and a multiplier that may multiply the pieces by the sequence) and that the DSSS spreading may use a common spreading sequence for each piece.

Using the above operations/blocks, fixed-energy symbols may be decomposed into first pieces and then, optionally, into chips that, when taken together in groups corresponding to an individual one of the symbols, may contain substantially the same fixed amount of energy as was in the original symbol, but with more transitions per unit time and hence a lower power density. The resulting pieces or chips may be modulated onto a signal 42 and transmitted to a receive side 43. Transmission may be by means of radio frequency (RF) or other wireless communications.

FIG. 2 shows a conceptual diagram of the reverse blocks/operations that may be used at a receive side to process a signal that was processed using the techniques of FIG. 1. Standard receiver front-end operations (e.g., filtering, amplification) may performed, and this may be followed by demodulation. If spreading was used, de-spreading 21 may be used at the receive side. The de-spreader 21 output may be provided for descrambling/de-interleaving 22; again, if there was no additional spreading 14, de-spreading 21 may be omitted. Descrambling/de-interleaving 22 may be performed on a block of received scrambled/interleaved symbol pieces (a part of which may be similar to what is shown in FIG. 3D). The result may be descrambled/de-interleaved symbol pieces, a non-limiting example of which is shown in FIG. 3C. The resulting symbols, which may correspond to the code symbols (if coding was used), as in FIG. 3B may then be decoded 23, using a decoder corresponding to the error-control coding 11 used at the transmit side 41 (again, if coding was used), and the information symbols may thereby be recovered. Again, implementations may correspond to those described above for the various corresponding operations.

As an example, suppose that one would like to transmit a 10 kbps signal spread by a factor of 80, in order to meet energy level requirements. The 10 kbps signal may nominally have transitions every 0.1 ms. To spread by a factor of 80, transitions may need to occur every 1.25 µs. In one example, each symbol may be divided into five pieces, of 0.02 ms, and the pieces may be scrambled. Then, each piece may be further spread using a 16-chip PN sequence for each 0.02 ms piece. The result may be a sequence of chips that may nominally have transitions every 1.25 µs. In another variation, using the example of FIG. 3, in which the symbols are divided into 16 pieces, each piece may be spread using a 5-chip sequence, which taken together may provide a similar overall spreading factor.

Figure 5:
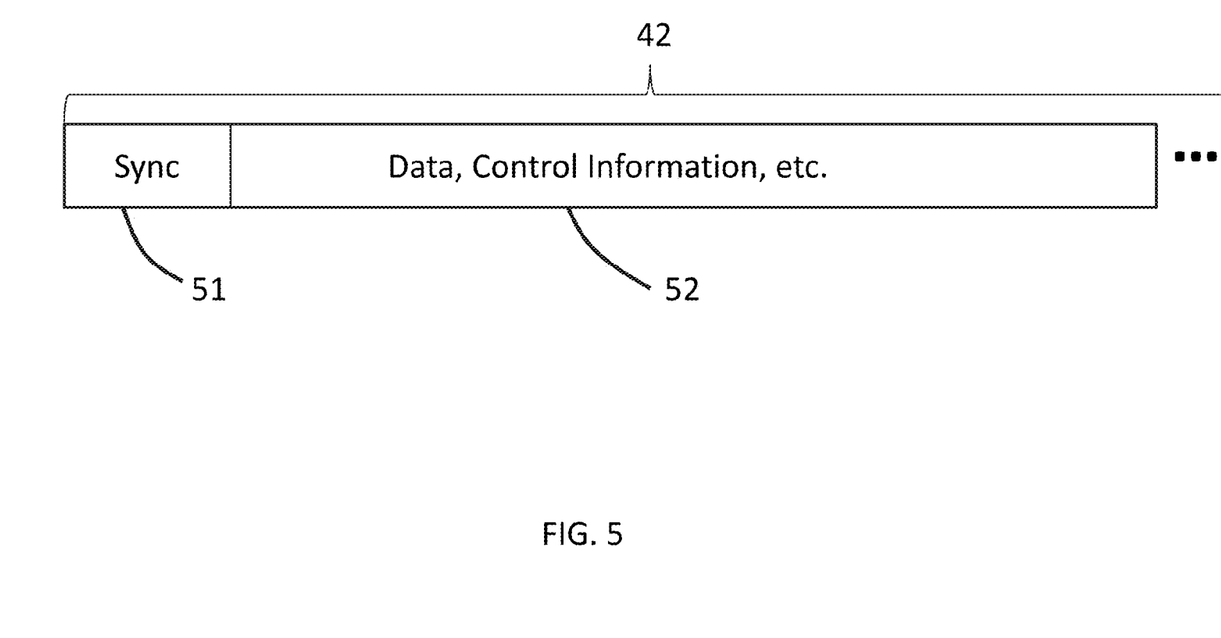
FIG. 5 shows an example of further signaling-related concepts, according to an aspect of the disclosure.

Referring again to FIGS. 2 and 4, in order to correctly de-spread 21 and/or descramble/de-interleave 22 the received signal content, one may need to acquire at least some degree of timing synchronization. Such synchronization may be obtained, for example, by the use of a known synchronization sequence 51 in signal 42, e.g., as shown in FIG. 5. The synchronization sequence 51 may be followed by other control/coordination signaling, data, etc. 52, and may be repeated at regular intervals.

In a particular implementation, the synchronization sequence 51 may comprise a short framing sequence. For example, if frames of length 0.5 s are used, a framing sequence lasting 6-8 ms may be used. That is, a new frame, and thus a copy of the framing sequence, is sent every 0.5 s. In the example discussed above, with a 10 kbps information signal and a spreading factor of 80, this repeated framing sequence may provide sufficient granularity to synchronize timing to within one-third of a chip, which may, in turn, be sufficient to synchronize a sampling device at the receive side 43 to sample the received signal so as to recover at least one sample per chip. The synchronization may be implemented at the receive side 43 using any one of a number of known techniques, for example, but not limited to, sliding correlation or matched filtering.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of data communication using spectral widening, the method including:
   receiving a sequence of transmitted scrambled symbol pieces of shorter duration than an entire symbol and corresponding to a block of data-bearing symbols whose respective symbols were divided into the symbol pieces, wherein a respective number of symbol pieces for a respective symbol is adaptive;
   descrambling the sequence of transmitted scrambled symbol pieces to recover the block of data-bearing symbols; and
   receiving information indicative of the number of pieces and adapting the descrambling based on the received information.

2. The method of claim 1, wherein the descrambling comprises an inverse operation to a pseudo-random scrambling operation used to scramble the symbol pieces.

3. The method of claim 1, wherein the method further includes performing error-control decoding on the block of data-bearing symbols.

4. The method of claim 1, wherein the symbol pieces are of substantially equal duration.

5. The method of claim 1, further including direct-sequence de-spreading the sequence of transmitted scrambled symbol pieces prior to descrambling.

6. The method of claim 5, wherein the direct sequence de-spreading uses a common sequence to de-spread each of the symbol pieces.

7. The method of claim 1, wherein the sequence of transmitted scrambled symbol pieces comprises symbol pieces of different symbols of the block of data-bearing symbols scrambled across the block of data-bearing symbols to change the order of transmission of the symbol pieces.

8. A receive-side data communication apparatus, including:
   a receiver configured to receive a sequence of transmitted scrambled symbol pieces of shorter duration than an entire symbol and corresponding to a block of data-bearing symbols whose respective symbols were divided into the symbol pieces; and
   a descrambler configured to descramble the scrambled symbol pieces to recover the block of data-bearing symbols,
   wherein a number of pieces per respective symbol is adaptive, wherein the receiver is further configured to receive information indicative of the number of pieces, and wherein the descrambler is further configured to be adapted based on the received information.

9. The apparatus of claim 8, further including an error-control decoder configured to accept and decode the block of data-bearing symbols.

10. The apparatus of claim 8, wherein the symbol pieces are of substantially equal duration.

11. The apparatus of claim 8, further including a direct-sequence de-spreader configured to direct-sequence de-spread each respective symbol piece and disposed prior to the descrambler.

12. The apparatus of claim 11, wherein the direct-sequence de-spreader is configured to use a common sequence to de-spread the respective symbol pieces.

13. The apparatus of claim 8, wherein the receiver is a wireless communication receiver.

14. The apparatus of claim 8, wherein the descrambler is configured to descramble the symbol pieces according to an inverse operation to a pseudo-random scrambling operation used to scramble the symbol pieces.

15. The apparatus of claim 8, wherein the sequence of transmitted scrambled symbol pieces comprises symbol pieces of different symbols of the block of data-bearing symbols scrambled across the block of data-bearing symbols to change the order of transmission of the symbol pieces.

16. A storage device containing executable instructions configured to result in the implementation of operations including:
   descrambling a received sequence of transmitted scrambled symbol pieces of duration shorter than a symbol and corresponding to a block of data-bearing symbols whose respective symbols were divided into the symbol pieces to recover the block of data-bearing symbols, wherein a number of symbol pieces per respective symbol is adaptive; and
   adapting the descrambling based on received information indicative of the number of pieces.

17. The storage device of claim 16, wherein the descrambling comprises an inverse operation to a pseudo-random scrambling operation used to scramble the symbol pieces.

18. The storage device of claim 16, wherein the operations further include performing error-control decoding on the block of data-bearing symbols.

19. The storage device of claim 16, wherein the symbol pieces are of substantially equal duration.

20. The storage device of claim 16, wherein the operations further include direct-sequence de-spreading the sequence of transmitted scrambled symbol pieces prior to descrambling.

21. The storage device of claim 20, wherein the direct sequence de-spreading uses a common sequence to de-spread each of the symbol pieces.

22. The storage device of claim 16, wherein the sequence of transmitted scrambled symbol pieces comprises symbol pieces of different symbols of the block of data-bearing symbols scrambled across the block of data-bearing symbols to change the order of transmission of the symbol pieces.

23. A communication apparatus including:
   at least one processing device; and
   the storage device of claim 16, wherein the at least one processing device is coupled to the storage device and is configured to execute the executable instructions.

* * * * *